(12) United States Patent
Challita

(10) Patent No.: US 12,477,630 B2
(45) Date of Patent: Nov. 18, 2025

(54) TEMPERATURE SENSING INDUCTION HEATING TOOL

(71) Applicant: OMG, Inc., Agawam, MA (US)

(72) Inventor: Antonios Challita, Bellbrook, OH (US)

(73) Assignee: OMG Building Products LLC, Agawam, MA (US)

(*) Notice: Subject to any disclaimer, the term of this patent is extended or adjusted under 35 U.S.C. 154(b) by 0 days.

(21) Appl. No.: 18/671,382

(22) Filed: May 22, 2024

(65) Prior Publication Data
US 2024/0314893 A1    Sep. 19, 2024

Related U.S. Application Data

(63) Continuation of application No. 15/636,860, filed on Jun. 29, 2017, now Pat. No. 12,016,103.
(Continued)

(51) Int. Cl.
*H05B 6/10* (2006.01)
*B29C 65/00* (2006.01)
(Continued)

(52) U.S. Cl.
CPC .............. *H05B 6/105* (2013.01); *E04D 5/145* (2013.01); *E04D 5/147* (2013.01); *E04D 5/148* (2013.01);
(Continued)

(58) Field of Classification Search
CPC .......... H05B 6/105; H05B 6/14; E04D 5/145; E04D 5/147; E04D 5/148; E04D 5/149; E04D 15/04
(Continued)

(56) References Cited

U.S. PATENT DOCUMENTS

| 3,484,840 A | 12/1969 | Spoth et al. |
| 4,355,222 A * | 10/1982 | Geithman ................ C09J 5/06 |
| | | 219/674 |

(Continued)

FOREIGN PATENT DOCUMENTS

| EP | 2491360 B1 | 9/2018 |
| JP | 2004352555 A | 12/2004 |

(Continued)

OTHER PUBLICATIONS

Japanese Office Action dated Apr. 13, 2021 for Application No. 2018-567195, 13 pgs.
(Continued)

*Primary Examiner* — Steven W Crabb
*Assistant Examiner* — Alba T Rosario-Aponte
(74) *Attorney, Agent, or Firm* — Alix, Yale & Ristas, LLP

(57) ABSTRACT

An induction heating tool that holds voltage or current supplied to the induction tank circuit constant and tracks changes in the other of voltage or current during each induction heating cycle. The disclosed induction heating tool exploits the fact that the resistance an attachment plate increases along with the temperature of the attachment plate. During an induction heating cycle, the attachment plate is magnetically coupled to a work coil and the resistance of the attachment plate is reflected to the circuit. Changes in the resistance of the attachment plate alter the pattern of energy delivery from the work coil to the attachment plate in a predictable way. Calculations accurately predict the temperature of the attachment plate over a wide variety of ambient conditions, including the presence of moisture at the membrane/attachment plate interface. The disclosed induction heating tool produces consistent results without calibration for ambient conditions.

11 Claims, 7 Drawing Sheets

Related U.S. Application Data

(60) Provisional application No. 62/355,997, filed on Jun. 29, 2016.

(51) Int. Cl.
| | | |
|---|---|---|
| *B29C 65/46* | (2006.01) | |
| *B29C 65/48* | (2006.01) | |
| *B29C 65/50* | (2006.01) | |
| *B29C 65/82* | (2006.01) | |
| *B29L 31/10* | (2006.01) | |
| *E04D 5/14* | (2006.01) | |
| *E04D 15/04* | (2006.01) | |
| *H05B 6/14* | (2006.01) | |

(52) U.S. Cl.
CPC ............ *E04D 5/149* (2013.01); *E04D 15/04* (2013.01); *H05B 6/14* (2013.01); *B29C 65/46* (2013.01); *B29C 65/4815* (2013.01); *B29C 65/5057* (2013.01); *B29C 65/8207* (2013.01); *B29C 66/1122* (2013.01); *B29C 66/43* (2013.01); *B29C 66/474* (2013.01); *B29C 66/71* (2013.01); *B29C 66/7352* (2013.01); *B29C 66/7392* (2013.01); *B29C 66/742* (2013.01); *B29C 66/7422* (2013.01); *B29C 66/74283* (2013.01); *B29C 66/80* (2013.01); *B29C 66/861* (2013.01); *B29C 66/91214* (2013.01); *B29C 66/91221* (2013.01); *B29C 66/91315* (2013.01); *B29C 66/91655* (2013.01); *B29C 66/9192* (2013.01); *B29C 66/91921* (2013.01); *B29C 66/9532* (2013.01); *B29C 66/961* (2013.01); *B29L 2031/108* (2013.01)

(58) Field of Classification Search
USPC ........................................................ 219/667
See application file for complete search history.

(56) References Cited

U.S. PATENT DOCUMENTS

| | | | |
|---|---|---|---|
| 5,250,776 A | | 10/1993 | Pfaffmann |
| 5,500,511 A | * | 3/1996 | Hansen ............... B29C 66/3472 156/272.4 |
| 5,573,613 A | | 11/1996 | Lunden |
| 5,760,379 A | * | 6/1998 | Matsen ................. B29C 66/934 219/664 |
| 5,916,469 A | * | 6/1999 | Scoles ................. B29C 65/5057 428/95 |
| 6,229,127 B1 | | 5/2001 | Link |
| 6,509,555 B1 | * | 1/2003 | Riess ..................... B23K 13/01 219/663 |
| 6,639,198 B2 | | 10/2003 | Reiss et al. |
| 6,710,314 B2 | | 3/2004 | Reiss et al. |
| 6,849,837 B2 | | 2/2005 | Riess et al. |
| 7,105,781 B2 | | 9/2006 | Wilkins et al. |
| 7,457,344 B2 | | 11/2008 | Fishman et al. |
| 8,523,429 B2 | | 9/2013 | Malyshev et al. |
| 9,395,250 B2 | | 7/2016 | Malyshev et al. |
| 2006/0006169 A1 | | 1/2006 | Fukushi et al. |
| 2007/0023422 A1 | * | 2/2007 | Obata ..................... H05B 6/105 219/633 |
| 2008/0029507 A1 | | 2/2008 | Barber et al. |
| 2008/0063025 A1 | | 3/2008 | Fishman et al. |
| 2008/0238386 A1 | | 10/2008 | Kagan |
| 2014/0008355 A1 | | 1/2014 | Chaffey et al. |
| 2014/0345806 A1 | | 11/2014 | Gasser et al. |
| 2015/0060439 A1 | | 3/2015 | Pankratz et al. |
| 2018/0007743 A1 | | 1/2018 | Challita |

FOREIGN PATENT DOCUMENTS

| | | |
|---|---|---|
| JP | 2008119417 A | 5/2008 |
| JP | 2015207508 A | 11/2015 |
| JP | 2015220015 A | 12/2015 |
| JP | 2015220050 A | 12/2015 |
| JP | 2015220051 A | 12/2015 |
| WO | 2018005724 A1 | 1/2018 |

OTHER PUBLICATIONS

PCT International Search Report and Written Opinion for International Application No. PCT/US2017/039869 filed Jun. 29, 2017, Date of Mailing: Oct. 24, 2017, 14 pgs.

* cited by examiner

TEMPERATURE SENSING INDUCTION HEATING TOOL

BACKGROUND

The disclosure relates generally to an induction heating apparatus and is particularly directed to an induction heating apparatus of the type used to secure a membrane to a roof.

Membrane roofing systems commonly include a layer of rigid insulation secured to the roof support structure and overlaid with a waterproof membrane. The insulation is secured to the roof structure by fasteners passing through attachment discs. The attachment discs are coated with a thermally activated adhesive material. This adhesive material remains inactive until after the membrane material is rolled across the roof. Induction heating tools, such as that disclosed in U.S. Pat. No. 6,509,555 are used to inductively heat the disc through the membrane, thereby activating the adhesive and securing the membrane to the discs and roof structure.

The quality of the bond between the attachment disc and the membrane is an important factor in the overall integrity of the finished roofing system. The objective is to evenly heat the attachment plate to activate the adhesive. Uneven or insufficient heating can result in a weak bond, while overheating can burn the insulation and/or membrane. Prior art induction heating tools have used a variety of techniques to estimate or measure the temperature of the attachment plate for the purpose of determining the applied power and duration of an induction heating cycle. The prior art techniques are complicated by the fact that the attachment plate is beneath the roofing membrane and cannot be accessed directly. One technique employed a calculation based on the quantity of energy delivered to the work coil of the induction welding tool to estimate the quantity of energy delivered to the attachment plate. The quantity of energy delivered to the attachment plate can be used to estimate the temperature increase of the plate, under known ambient conditions. This technique could not account for the presence of moisture (between the membrane and the attachment plate) and required calibration to account for very cold or very hot ambient conditions.

There is a need for an induction heating tool that can accurately predict the temperature of an attachment plate during an induction heating cycle, regardless of ambient temperature or the presence of moisture between the membrane and attachment plate.

SUMMARY

The disclosed induction heating tool holds voltage or current supplied to the induction tank circuit constant and tracks changes in the other of voltage or current during each induction heating cycle. The disclosed induction heating tool exploits the fact that the resistance of the attachment plate increases along with the temperature of the attachment plate. During an induction heating cycle, the attachment plate is magnetically coupled to the work coil and the resistance of the attachment plate is reflected to the circuit. Changes in the resistance of the attachment plate alter the pattern of energy delivery from the work coil to the attachment plate in a predictable way. In one disclosed embodiment, voltage applied to the induction tank circuit is held constant and changes in the current delivered to the induction tank circuit are measured and used to calculate the temperature of the attachment plate. Experimentation has shown that these calculations accurately predict the temperature of the attachment plate over a wide variety of ambient conditions, including the presence of moisture at the membrane/attachment plate interface. The disclosed induction heating tool produces consistent results without calibration for ambient conditions.

DETAILED DESCRIPTION OF THE DISCLOSED EMBODIMENTS

Figure 1A:
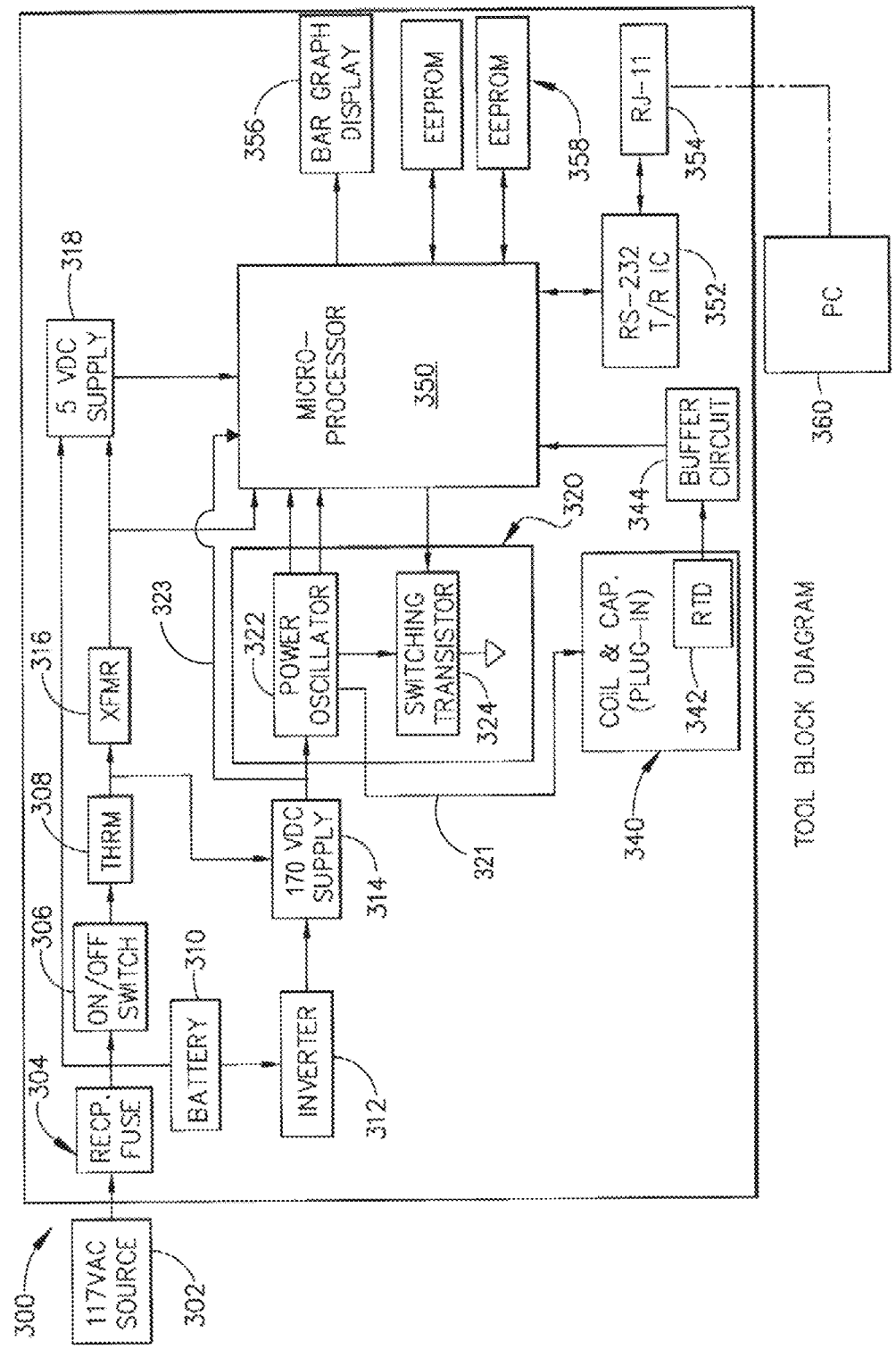
FIG. 1A is a block diagram of the main electrical components of an embodiment of the disclosed induction heating tool.
Figure 1B:
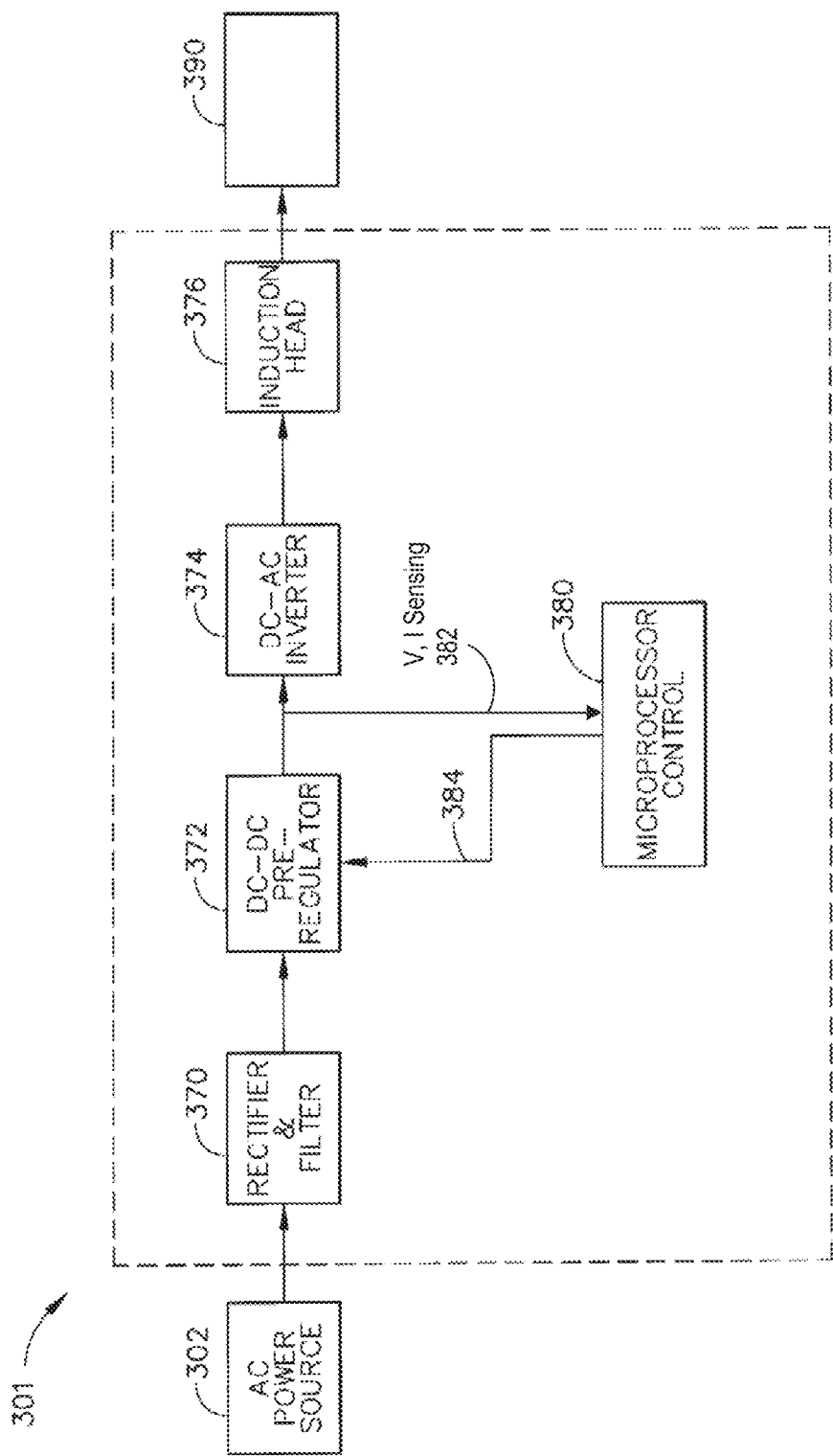
FIG. 1B is a block diagram of the main electrical components of an alternative embodiment of the disclosed induction heating tool.

FIGS. 1A and 1B are block diagrams of major electrical components of embodiments of the disclosed induction heating tool. FIG. 1A is a block diagram 300 of the major electrical components of a first embodiment of the disclosed induction heating tool. Starting with a power source of 117 VAC (also sometimes referred to herein as a 120 VAC alternating current source) at 302, the line power is connected to a fuse at 304, then an ON-OFF switch at 306 and a thermistor at 308. Line voltage is applied to a transformer 316, which supplies a 170 VDC power supply 314. The power supply 314 may be a buck boost-type configured to provide a substantially constant DC voltage to the oscillator board 320. The disclosed buck boost, constant voltage 170 VDC power supply is a non-limiting example and other power sources, such as batteries or other power supply configurations may be employed to provide power to the oscillator board 320. When using a battery, there would be no 117 VAC (or 120 VAC) source. Instead, a battery 310 is utilized, which provides direct current into an inverter stage at 312, becoming the power source for the 170 VDC power supply 314. Either the battery 310 or the transformer 316 provides power for a +5 VDC power supply 318. This +5 volt supply provides power to a microprocessor 350 and other digital components of the circuit.

The output of the 170 VDC power supply drives a power oscillator stage 322, which is the DC-to-AC inverter. A single oscillator (printed circuit) board 320 can contain both power oscillator 322 and a switching transistor 324. The output of inverter 322 drives a work coil and a set of power capacitors, which in combination are a tank circuit designated by the reference numeral 340. A temperature sensor at 342 (referred to herein as an RTD, or Resistive Temperature Detector) is provided at the work coil, and the output of the temperature sensor 342 is directed to a buffer circuit 344, which in turn drives an input of the microprocessor circuit 350. This typically would be an analog signal, so an A/D converter is required, either in the buffer circuit 344 or on board the microprocessor stage 350. The temperature sensor 342 allows the tool to interrupt operation in the event that the coil exceeds a pre-determined temperature.

The induction heating tool of FIG. 1A utilizes a multiple-segment bar graph display 356, and also uses multiple EEPROM memory chips 358. In addition, this first embodiment tool uses an RS-232 serial communications port at 352, which has an RJ-11 jack at 354. This allows the induction heating tool to be in communication with a remote computer, such as a PC at 360 on FIG. 1A. The EEPROM chips, bar graph display and serial communications protocol are non-limiting examples and other memory, display and communication options are compatible with the disclosed induction heating tool.

In the disclosed embodiment, power supply 314 is configured to provide a continuous 170 VDC to the oscillator board 320. Voltage and/or current at the output of the power supply 314 are monitored at 323 by the microprocessor 350. As discussed in greater detail below, since voltage is held constant at the output of power supply 314, changes in power consumed by the resonant tank circuit 340 produce changes in current measured at the output of the power supply 314. Microprocessor 350 is programmed to monitor changes in current delivered to the oscillator board 320 and correlate those changes to the temperature of the work piece, e.g., the attachment plate.

Referring now to FIG. 1B, a block diagram 301 is provided illustrating some of the major electrical components of an alternative embodiment of the disclosed induction heating tool. An AC power source, such as 120 VAC line voltage, is provided to supply power to a rectifier and filter stage at 370. A DC-DC pre-regulator 372 receives direct current from the output of the rectifier/filter stage 370, and a DC-AC inverter 374 receives a controlled voltage level from the pre-regulator 372. The output of the inverter 374 is used to drive an induction head 376.

Figure 2:
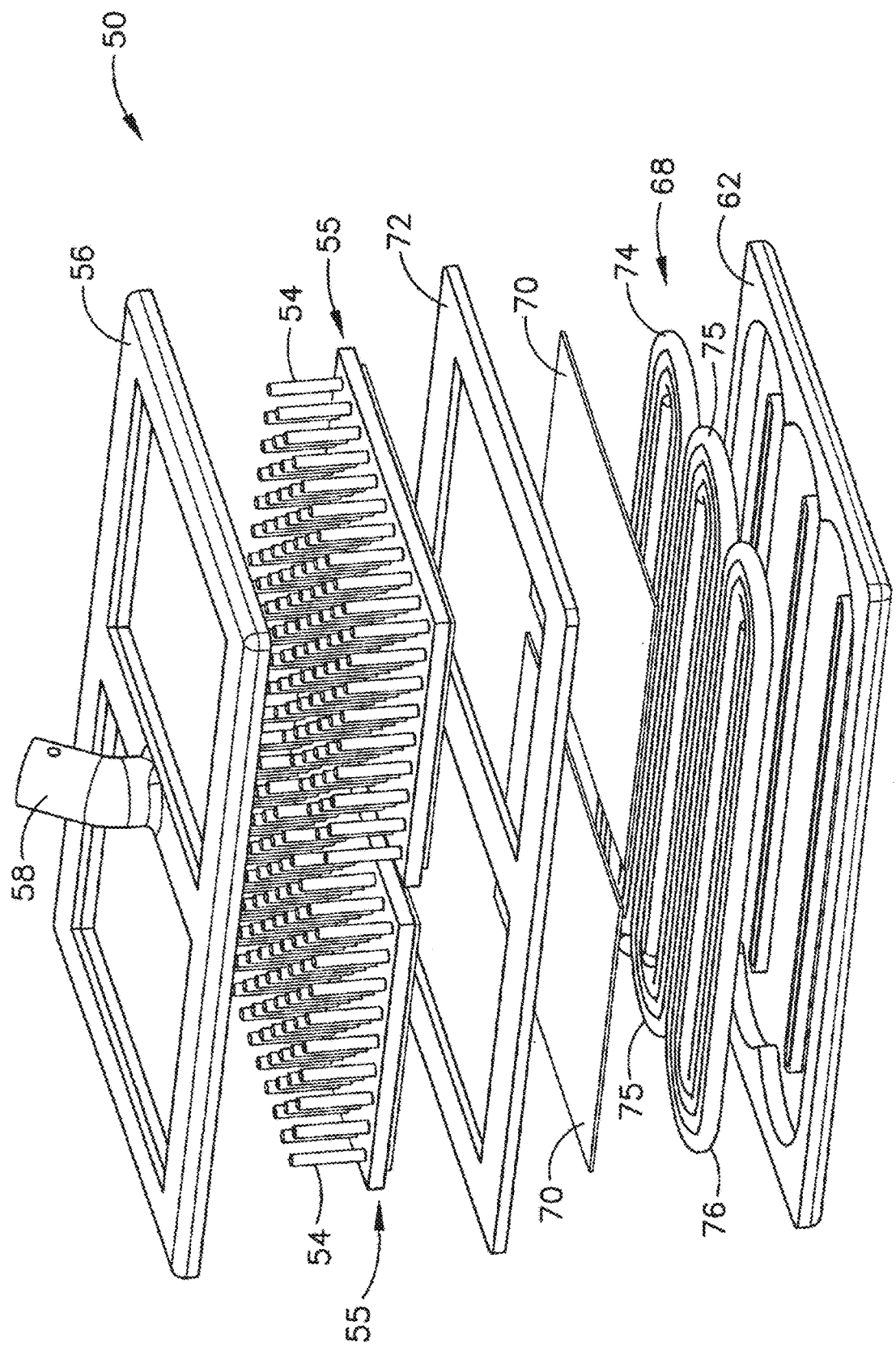
FIG. 2 is an exploded perspective view of an exemplary work coil compatible with the disclosed induction heating tool.
Figure 3:
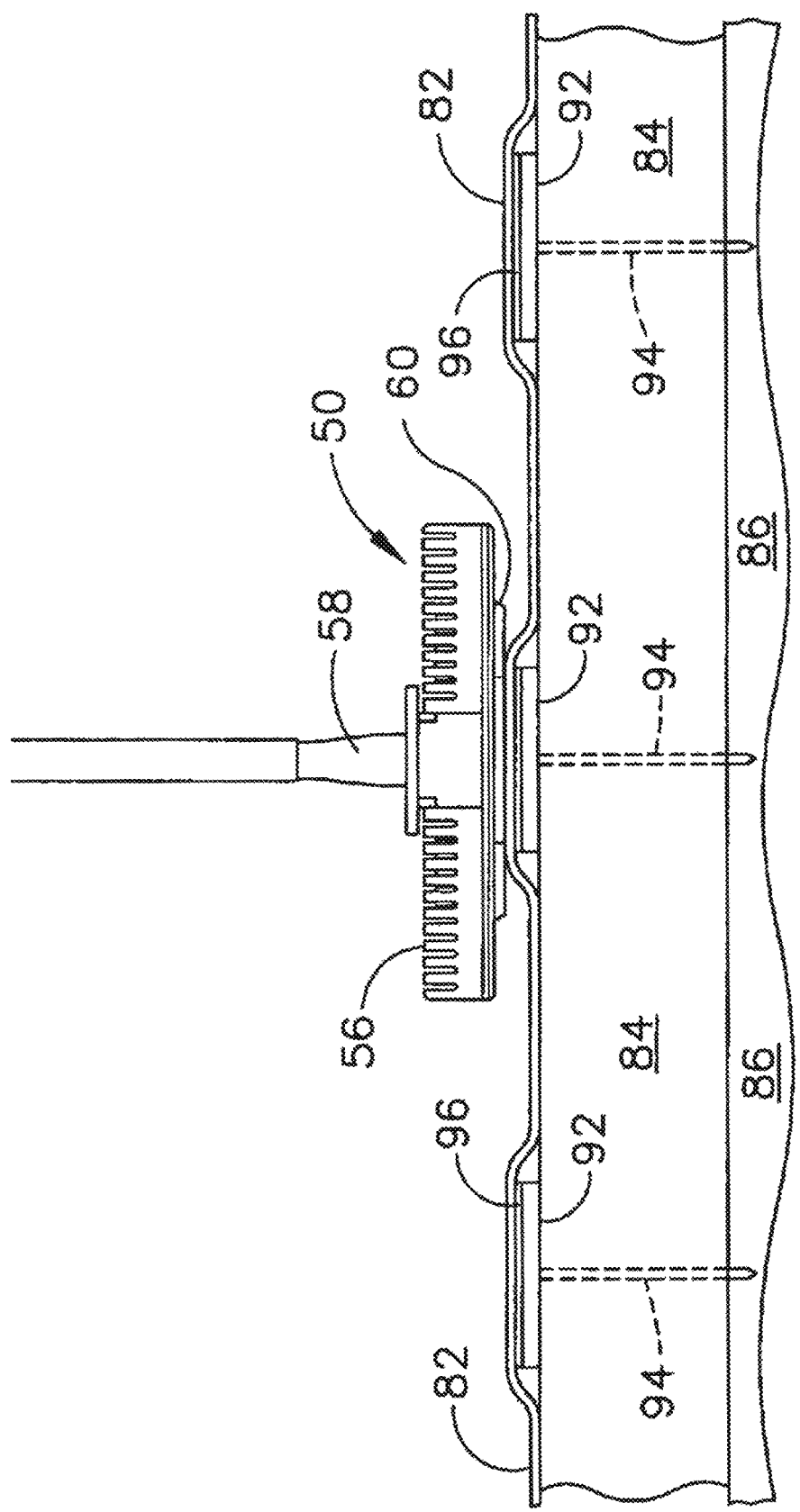
FIG. 3 is a sectional view of a representative membrane roof in functional conjunction with an induction heating tool according to aspects of the disclosure.
Figure 4:
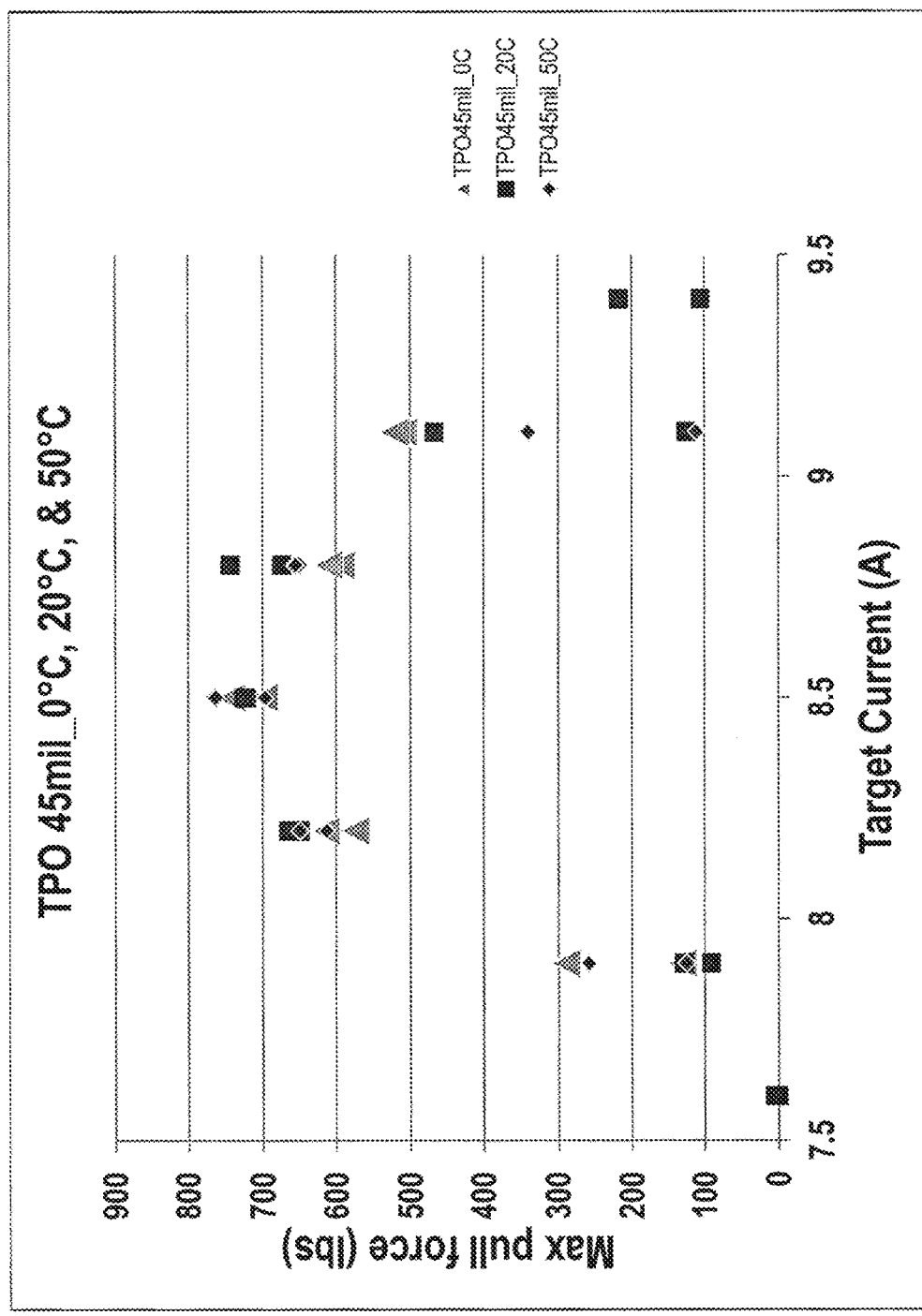
FIG. 4 is a graph showing the bond strength produced by the disclosed induction heating tool at ambient temperatures of 0° C., 20° C. and 50° C.

The induction head 376 generates a high energy oscillating magnetic field via a work coil (not shown on FIG. 1B, but which is part of the induction head and is illustrated in FIG. 2), and this magnetic field is directed toward a work piece 390. In the context of the present disclosure, the work piece is attachment plate 92 beneath a membrane 82 as shown in FIG. 3. One example of an attachment plate 92 is a round plate of carbon steel approximately three inches in diameter and 0.030" thick, coated with a heat activated adhesive 96. Placing the steel attachment plate in the magnetic field generated by the induction head 376 results in a "coupled" relationship between the work coil 75 (see FIG. 2) and the attachment plate 92 where changes in the properties of the attachment plate can be detected by monitoring the behavior of the circuit generating the magnetic field. The oscillating magnetic field establishes eddy currents in the attachment plate 92, where resistance to the oscillating currents produces heating of the attachment plate. As the attachment plate 92 heats up, the pattern of energy absorbed by the plate is reflected back to the induction tank circuit, where changes in applied power alter the current delivered from the power supply.

A controller 380 utilizing a microprocessor is provided to detect the voltage and/or current parameters 382 at the output of the pre-regulator 372. Controller 380 is responsive to the sensed parameters 382, and determines the length of time that power is applied to the inverter 374 and induction head 376. The controller could use a logic-state machine in lieu of a microprocessor, if desired. Furthermore, the entire interface and control circuit could be constructed entirely of analog components, as will occur to those skilled in the art.

Referring back to FIG. 1B, during operation the rectifier/filter stage 370 receives AC power from the AC power source 302. The DC-DC pre-regulator 372 pulse-width modulates the DC power signal from the stage 370 to provide a DC "power" signal of the proper magnitude to allow the DC-AC inverter 374 to energize the induction head 376 with sufficient high frequency AC power to induce heating in the work piece 390.

In one mode of the second preferred embodiment, the DC-AC inverter 374 operates at a nearly fixed frequency of 100 kHz. The sensed voltage and/or current at 382 at the output of the pre-regulator 372, is fed to the controller 380, which uses the sensed voltage and/or current to determine the proper operating parameters of the induction head 376 and provides the DC-DC pre-regulator 372 with control instructions or commands 384. The voltage and/or current produced by the pre-regulator 372 is varied, as necessary, to keep the input power (i.e., the input voltage or current being detected at 382) at a substantially constant pre-determined value. In the disclosed embodiment of an induction heating tool, the work coil is incorporated into a resonant tank circuit having a non-limiting, exemplary pre-determined operating frequency of 100 KHz. It will be understood by those skilled in the art that the induction tank circuit is designed to maximize the efficiency of energy delivery to the work piece and the configuration of the induction tank circuit, operating frequency and applied voltage and current may all be varied accordingly.

FIG. 2 illustrates a representative configuration for the lower portion of an induction heating tool according to aspects of the disclosure. The base portion 50 of FIG. 2 corresponds with the induction head 376 discussed above. The base portion 50 supports and contains the induction coil 68 (also referred to as the "work coil"), which in the disclosed embodiment is a triple "race track" coil 74, 75, 76. With reference to FIG. 2, an example of a base portion 50 of an induction heating tool is depicted in an exploded view, and its uppermost part is the top cover 56, which also includes an attachment point 58. The attachment point 58 can take any form needed to couple the base portion 50 to the induction heating tool. In use, the base 50 of the induction heating tool supports the induction coil 68 over an attachment plate 92 (see FIG. 3) so the attachment plate 92 is within the oscillating magnetic field generated by the induction coil 68. Beneath the top cover 56 is a sub-assembly 55, which holds a large number of pin heat sink elements 54. In FIG. 2, there are two such sub-assemblies 55, one on each side of the transverse centerline of the base 50. Beneath the sub-assemblies 55 is a spacer structure 72 which holds the sub-assemblies 55 in position.

Between the spacer 72 and the induction coil 68 is a "heat spreader" structure generally designated by the reference numeral 70. This heat spreader construction is used to more uniformly distribute the thermal energy being produced in the induction coil 68, so that thermal energy dissipation (i.e., heat transfer) will be maximized. In the illustrated embodiment of FIG. 2, there are two separate sheets of the heat spreader structure 70, which are in close proximity to the windings of the induction coil 68. If desired, the heat spreader could be in physical contact with the induction coil 68, to further maximize the thermal energy transfer (via conduction) away from the coil through the base portion 50. The construction of this heat spreader should be one that is a thermal conductor, but also an electrical insulator. Certain ceramics can be used as this heat spreader device, and in a preferred construction of the present invention, the heat spreader portions 70 can be made of aluminum nitride. The base 50 includes a bottom cover 62 defining the lower surface of the induction heating tool. Just above the bottom cover 62 is the induction coil structure 68.

The triple racetrack coil 68 is made of three oval-shaped windings 74, 75, 76, and these windings can be electrically connected in series, if desired, or they can be connected in three parallel windings. In any case of the configuration illustrated in FIG. 2, each of the windings 74, 75, and 76 has multiple turns. Alternatively, the three coils can be wound from a single length of wire arranged in the form of three oval shapes. The triple racetrack coil configuration generates an oblong magnetic field that permits some leeway with respect to centering the coil 68 over the target attachment plate 92. With reference to FIG. 3, the oblong shape of the magnetic field means that the flexibility of position is greater in the lateral direction (parallel with the plane of FIG. 3) than it is in the forward-back direction (perpendicular to the plane of FIG. 3). The configuration of the induction coil 68 is a compromise between efficiency and ease of use. In the case of a roof system with a foil faced rigid insulation, it is undesirable to have the magnetic field extend beyond the circumference of the attachment plate, which can heat the foil and burn the insulation. The theory of operation of the disclosed induction heating tool is not limited to any particular induction coil configuration, and the illustrated induction coil is intended as a non-limiting example.

The induction coil resonates at the intended frequency by means of a capacitor (or bank of capacitors) in parallel with the induction coil assisted by one or more switching transistors. The parallel resonance magnifies the current through the induction coil, while the power supply driving the resonant circuit sees a sinusoidal load current. In this parallel resonant tank circuit, the power supply adds only the part of the load current that is lost to resistance in the components or does the work of heating the work piece, while the large working current is localized to the induction coil and the capacitor (which is typically a bank of several capacitors). The presence of a work piece damps the parallel resonant circuit and the current drawn from the power supply increases when a work piece is coupled to the induction coil.

In practice, the effective resistance (impedance) of the induction coil, the effective resistance (impedance) of the tank capacitor and the reflected resistance of the work piece each introduce a loss into the tank circuit and damp the resonance. The sum of these resistances can be combined into a single "loss resistance" that present a load to the power supply for the induction heating tool. When driven at resonance, the current drawn by the tank capacitor and the induction coil (together the induction tank circuit) are equal in magnitude and opposite in phase and therefore cancel each other out as far as the source of power is concerned. This means the only load seen by the power supply at the resonant frequency is the loss resistance across the induction tank circuit. The resistance presented by the capacitor and the induction coil are known and fairly stable, while the resistance of the work piece will change substantially as its temperature increases due to eddy currents induced by the high frequency magnetic fields from the induction coil.

Figure 5:
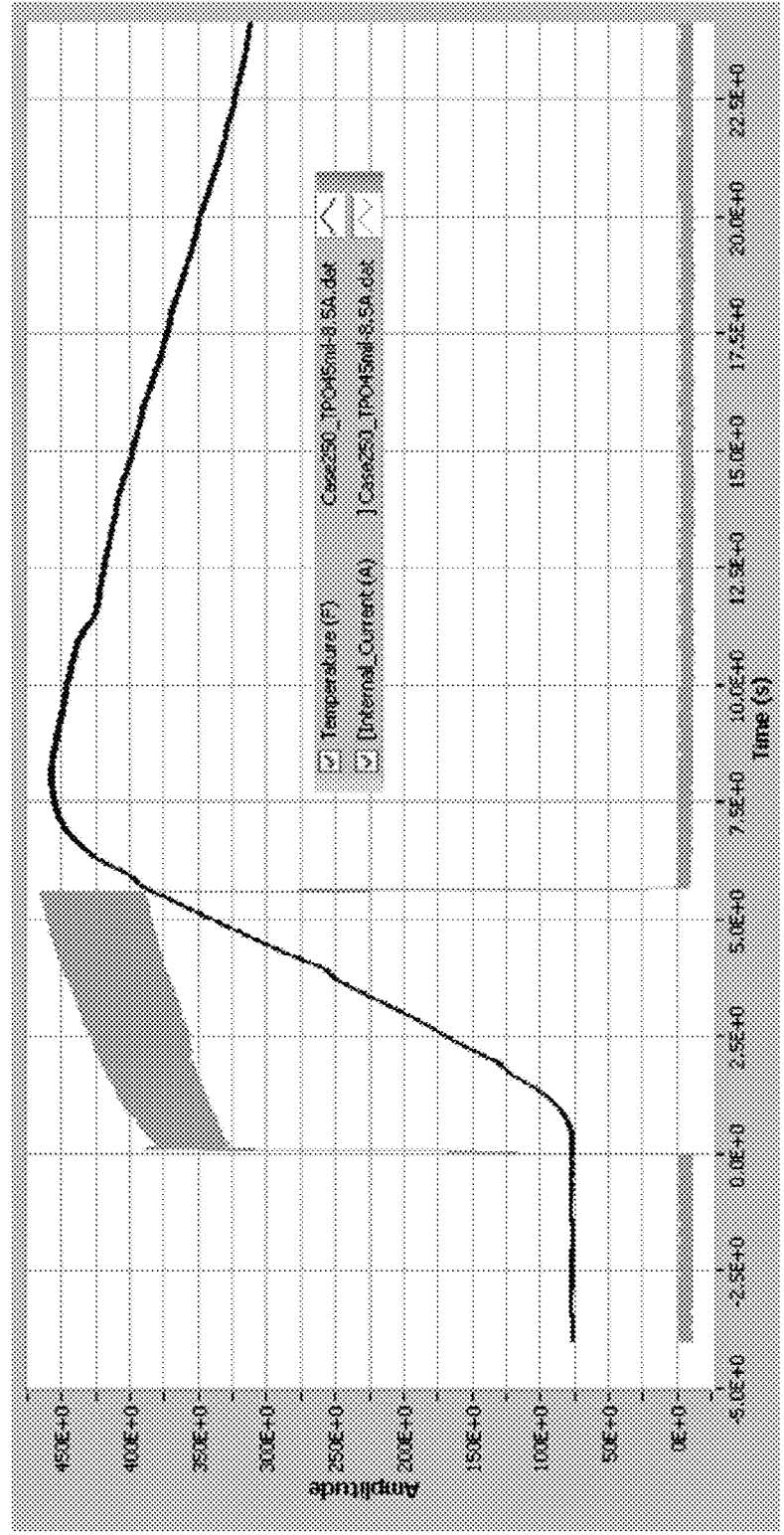
FIG. 5 is an overlay of current measured applied to the work coil of the disclosed induction heating tool and the resulting measured temperature of the target attachment plate.

Change in the resistance of the work piece increases the loss resistance to the tank circuit and results in a measurable change in the power consumed by the induction heating tool. As shown in FIG. 5, the current drawn from the power supply increases along with the resistance (and temperature) of the work piece. The resistance of the work piece can be correlated to its temperature, so measured changes in the current delivered to the tank circuit can be used to calculate (predict) the temperature of the work piece with a high degree of accuracy. In the disclosed roofing systems, the properties of the work piece, e.g., the attachment plate are known and can be used to design a tank circuit that will efficiently transfer energy into the attachment plate (work piece). As one example, carbon steel has a temperature coefficient of resistance a of 0.003/° C. that can be used to calculate the temperature of the attachment plate from changes in current applied to the induction tank circuit. The formula for this calculation is: $R_{plate}=R_0[1+\alpha(T-T_0)]$, where $R_0$ is the known resistance of the plate at a known temperature $T_0$. Alternatively, patterns can be stored in look up tables and used by the microprocessor to correlate current levels with attachment plate temperatures.

The increased plate resistance causes the tool to deliver more power in the form of increased current draw, since the power supply 314, 370/372 output voltage is fixed regardless of the input voltage source. There is a direct relationship between the plate temperature and the current drawn from the power supply 314, 370/372. This relationship is different for different membrane thicknesses, because the membrane thickness affects the coupling between the coil and the plate. Each plate type will also have a different temperature/resistance profile that needs to be taken into account. The relationship between the measured variable and plate temperature can be determined experimentally and stored in a look up table for reference by a microprocessor. Alternatively, the relationship could be reduced to a formula that is applied to the measured variable to determine plate temperature and control energy delivery to the plate.

Figure 6:
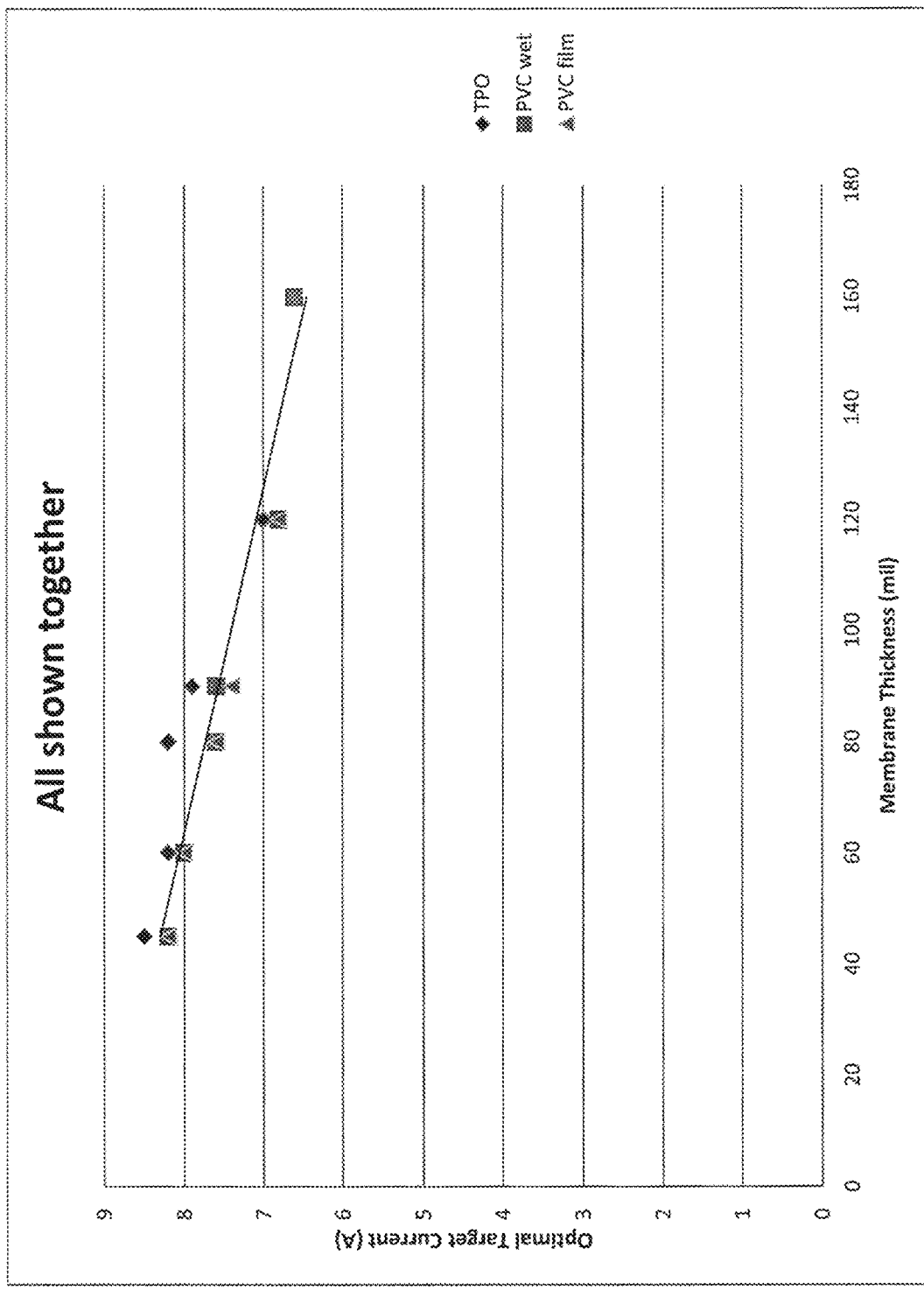
FIG. 6 is a graphical presentation showing optimal target current vs. membrane thickness for an exemplary induction heating tool according to aspects of the disclosure.

Membrane thickness and materials are also known and can be accounted for in the design and operation of the disclosed induction heating tool. Thicker membranes result in a greater distance between the induction coil and the work piece, which reduces the magnetic coupling between the induction coil and the work piece (attachment plate). Reduced magnetic coupling between the induction coil and the work piece reduces the amount of power delivered from the induction coil to the work piece, which reduces energy consumption at the output of the power supply. As shown in FIG. 6, the target current delivered to the induction coil decreases with increased membrane thickness. Given reduced coupling and power transfer between the induction coil and the attachment plate in the case of a thicker membrane, the time necessary to attain the desired heating is somewhat greater. The tool controls activation duration to achieve the target current, which corresponds to a pre-determined target plate temperature.

In an alternative embodiment, the tool is arranged to control activation to achieve a target current corresponding to a desired plate temperature, and then to maintain the target current for a pre-determined period of time. In this embodiment, the desired temperature could be somewhat lower than a peak temperature desired for the bonding plate, but the heat is maintained for a short period of time, which allows the heat to conduct across the plate and should result in a more evenly heated plate and more consistent bonds between the plate and the roofing membrane. In another alternative embodiment, an extended soak time feature is included whereby the heat is maintained for a longer period of time to ensure that the bonding plate is heated evenly in cold and/or moist environmental conditions. The disclosed soak time feature preferably maintains the temperature of the bonding plate at 210°-220° Fahrenheit for an additional 0.5-5 seconds to vaporize water and remove the cold and/or moist environmental conditions from the bonding plate. The tool may be provided with a user interface or switch that can be activated to indicate a temperature and/or moisture issue. The software may be provided with a step that looks for an input indicating the need for soak time and will implement an induction heating pattern that maintains the temperature of the attachment plate above the boiling temperature of water for a pre-determined period before bringing the temperature of the attachment plate to the target temperature of approximately 450° F.

In the disclosed embodiment of an induction heating tool, power is delivered to the tank circuit from a constant voltage power supply. Since the voltage at the output of the power supply does not change, variation in energy consumed by the tank circuit results in changes in current measured at the output of the constant voltage power supply.

The chief variables of the induction coil geometry are the wire type, total length of wire, winding pattern and separation between lobes of the coil. The coil variables, along with the operating variables of the oscillator board, are selected to provide efficient coupling and power transfer between the induction coil and the work piece. It is an objective of the disclosed induction heating tool to provide fast and consistent heating of the target attachment plates without hot or cold areas that would interfere with the quality of bond between the membrane and the attachment plate. The induction coil can be wound in any number of shapes, with each shape generating a differently configured magnetic field. The shape of the induction coil and magnetic field can be matched to the shape of the attachment plate, a roughly three inch circle. Matching the coil shape with the target shape calls for accurate alignment of the coil with the target to achieve even heating of the entire target. Matching the shape of the magnetic field to the shape of the target can minimize heating of material surrounding the target, so long as the coil is aligned over the target. Alternatively, the coil can be configured to generate a magnetic field that is larger than the target, so the entire target is heated without the need to precisely align the induction coil and target.

The induction coil of the disclosed induction heating tool is preferably positioned as close as possible to the attachment plate so that the magnetic field generated by the induction coil will inductively heat the attachment plate. Thus, the induction coil is arranged in a part of the tool that can be situated on top of the roofing membrane directly above the position of the attachment plate as shown in FIG. 3.

With reference to FIG. 3, a membrane roof structure includes a top membrane layer 82 that may comprise some type of rubber or plastic compound. The main purpose of the membrane 82 is to prevent water from entering the building for which this roof is used. A layer of rigid thermal insulation 84 sits upon a substrate 86. The sheets 84 are typically held to the substrate 86 by a set of attachment disks 92 which have some type of fastener 94 mounted therethrough. The attachment disk 92 could be permanently attached to its fastener 94, if desired.

In typical membrane roofs, the attachment disks 92 are circular, and have a center opening through which a relatively long screw 94 is placed. The screw is then pushed and rotated into the substrate 86, thereby holding the attachment disks in place, while also holding the sheets of rigid insulation 84 in place.

In the present invention, the fasteners 94 run through the center opening in the attachment disk 92, and then through the sheets of thermal insulation 84, and finally into the substrate 86. These fasteners 94 do not run through the top membrane layer 82. However, the membrane layer 82 must somehow be attached to the substrate 86 to preserve the integrity of the roof when exposed to high winds, as required by building codes. In the present invention, the attachment disks 92 are coated (usually at the factory) with a thermally-activated adhesive material. This adhesive material remains inactive until after the membrane material is rolled across the roof. The induction heating tool is then brought in close proximity to one of the attachment disks 92, and activated. When that occurs, a magnetic field is emitted by the induction coil 68 which creates eddy currents in the electrically conductive portions of the disks 92.

In general, the disks 92 comprise a metallic substance (e.g., aluminum or steel), which would tend to be electrically conductive. When the eddy currents are generated, the disks 92 are raised in temperature to a point where the top adhesive 96 becomes active, and generally would melt. The adhesive 96 will then adhere to the bottom surface of the membrane layer 82. When the induction tool 10 is deactivated, the entire system cools down and the adhesive 96 remains adhered to the bottom surface of the membrane layer 82, thereby "permanently" mounting the membrane layer 82 onto the tops of the attachment disks 92. Since the attachment discs are connected to the roof structure 86 by the fasteners 94, the membrane is effectively connected to the roof structure.

What is claimed:

1. A method of securing a membrane to a structure, said method comprising:
    securing an attachment plate to the structure, said attachment plate comprising conductive metal and having a top surface facing away from the structure, said top surface of the attachment plate coated with a heat activated adhesive;
    placing the membrane over the attachment plate so that the attachment plate is covered by the membrane and the attachment plate is between the membrane and the structure with the top surface of the attachment plate facing a bottom surface of the membrane;
    providing a power supply connected to a tank circuit, said power supply having a pre-determined constant output voltage or pre-determined constant output current;
    connecting the tank circuit to an induction coil;
    positioning the induction coil adjacent a top surface of a portion of the membrane extending over the attachment plate;
    activating said power supply to energize said tank circuit, which resonates at a resonant frequency to generate an oscillating magnetic field emanating from the induction coil, said oscillating magnetic field inducing eddy currents in the conductive metal of the attachment plate magnetically coupled to the induction coil to heat the attachment plate;
    providing a control circuit connected to measure the output voltage or output current of the power supply that is not held constant;
    calculating the electrical resistance of the attachment plate using measured changes in the output voltage or output current that is not held constant; and
    deactivating said power supply in response to a calculated change in electrical resistance of the attachment plate that correlates to a pre-determined target temperature for the attachment plate.

2. The method of securing the membrane to the structure of claim 1, wherein the power supply maintains a constant output voltage and the control circuit measures changes in the output current of the power supply.

3. The method of securing the membrane to the structure of claim 2, wherein said step of calculating includes using changes in the current drawn from the power supply to calculate the electrical resistance of the attachment plate.

4. The method of securing the membrane to the structure of claim 1, wherein the control circuit maintains the pre-determined target temperature of the attachment plate for a pre-determined period of time before deactivating the power supply.

5. The method of securing the membrane to the structure of claim 4, wherein the control circuit increases said pre-determined period of time in response to an input corresponding to an ambient temperature below a pre-determined temperature or an input corresponding to the presence of moisture on the attachment plate.

6. The method of securing the membrane to the structure of claim 1, wherein said control circuit employs a look up table to correlate said electrical resistance to a temperature of said attachment plate.

7. A method of securing a membrane to a structure, said method comprising:
    securing an attachment plate to the structure, said attachment plate comprising conductive metal and having a top surface facing away from the structure, said top surface of the attachment plate coated with a heat activated adhesive;
    placing the membrane over the attachment plate so that the attachment plate is covered by the membrane and the attachment plate is between the membrane and the structure with the top surface of the attachment plate facing a bottom surface of the membrane;
    magnetically coupling the attachment plate to an induction heating circuit by:
positioning an induction coil adjacent a top surface of a portion of the membrane extending over the attachment plate;
energizing the induction coil with a high frequency alternating current to generate an oscillating magnetic field emanating from the induction coil, said oscillating magnetic field inducing eddy currents in the conductive metal of the attachment plate to heat the attachment plate;
wherein the attachment plate is magnetically coupled to the induction heating circuit by the oscillating magnetic field;
said induction heating circuit comprising a power supply constructed to generate said high frequency alternating current from a source of electrical power, and a control circuit connected to measure changes in power consumed by the power supply, said method comprising:
    measuring changes in the power consumed by the power supply while the attachment plate is magnetically coupled to the induction heating circuit;
    calculating an electrical resistance of the attachment plate using measured changes in the power consumed by the power supply; and
    deactivating said power supply in response to a calculated change in electrical resistance of the attachment plate that correlates to a pre-determined target temperature for the attachment plate.

8. The method of securing the membrane to the structure of claim 7, wherein said control circuit employs a look up table to correlate said electrical resistance to a temperature of said attachment plate.

9. The method of securing the membrane to the structure of claim 7, wherein an increase in temperature of the attachment plate causes an increase in resistance of the attachment plate and an increase in power consumed by the power supply.

10. The method of securing the membrane to the structure of claim 7, wherein the control circuit maintains the pre-determined target temperature of the attachment plate for a pre-determined period of time before deactivating the power supply.

11. The method of securing the membrane to the structure of claim 10, wherein the control circuit increases said pre-determined period of time in response to an input corresponding to an ambient temperature below a pre-determined temperature or an input corresponding to the presence of moisture on the attachment plate.

* * * * *